June 6, 1967 D. A. ZELLER, JR 3,324,309

BISTABLE SWITCH WITH CONTROLLED REFIRING THRESHOLD

Filed July 17, 1963

INVENTOR.
DAVID A. ZELLER, JR.
BY
Kenyon & Kenyon
ATTORNEYS

United States Patent Office 3,324,309
Patented June 6, 1967

3,324,309
BISTABLE SWITCH WITH CONTROLLED REFIRING THRESHOLD

David A. Zeller, Jr., Brookfield, Conn., assignor to Data-Control Systems, Inc., Danbury, Conn., a corporation of Delaware Filed July 17, 1963, Ser. No. 295,743
8 Claims. (Cl. 307—88.5)

This invention applies in general to bistable triggers and more particularly to an improvement in Schmitt triggers which will permit designing a symmetrically firing Schmitt trigger.

Schmitt triggers, which are fast switching bistable triggers, are well known in the art. Their attributes and deficiencies have been frequently discussed in the literature. Probably the major problem in using a Schmitt trigger is the problem to which this invention is addressed. That problem resides in the fact that the critical voltage at which a Schmitt trigger will fire, in one direction, as the input signal to the trigger is increasing is different than the critical voltage at which that trigger will refire as the input signal is decreasing.

It is a major purpose of this invention to provide an improvement to the Schmitt trigger so that the voltage at which triggering occurs on the ascending slope of an input signal will be the same as the voltage at which triggering occurs on the descending slope of an input signal.

The difference in firing voltage at which the Schmitt trigger fires and refires is known as hysteresis. It is widely recognized that hysteresis is desirable in order to provide stability of switching and in order to speed up the rate at which switching occurs. Since the Schmitt trigger is designed for fast, stable switching, the loss of hysteresis is most undesirable.

Accordingly, it is a more specific purpose of this invention to provide a compensation for hysteresis that will result in symmetrical triggering without doing away with the hysteresis so that stability of operation and fast switching can be coupled with symmetrical triggering.

Prior art designs which are provided for symmetrical triggering have done so by eliminating the hysteresis and thus have resulted in circuits of limited stability. Before this invention, it had been presumed that hysteresis and symmetrical firing were conflicting characteristics. This invention teaches a technique whereby one may design to obtain both hysteresis and symmetrical firing.

Broadly and briefly speaking, the design technique taught by this invention involves a means for shifting the voltage level of the hysteresis after switching has occurred by an amount equal to the hysteresis. Thus full advantage is taken of the hysteresis effect to assure fast and stable switching. Then after the switching has been completed, the biasing level in the trigger is shifted by an amount that compensates for the hysteresis and permits refiring at the same voltage level as the firing level.

Figure 1:
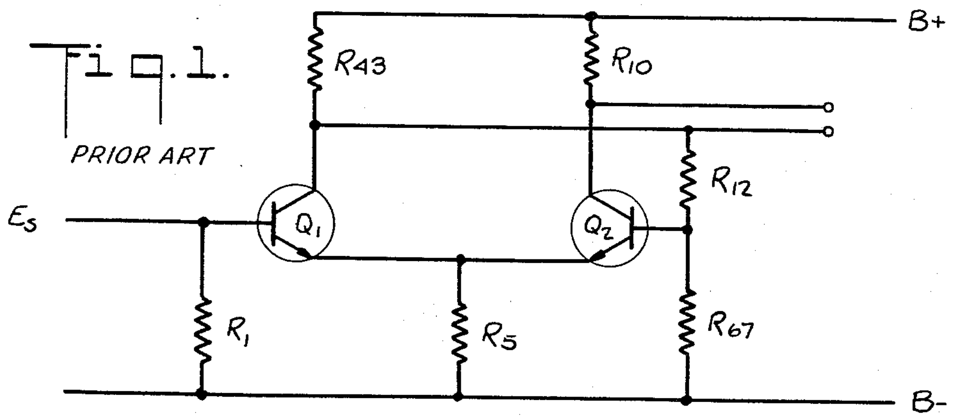
Figure 2:
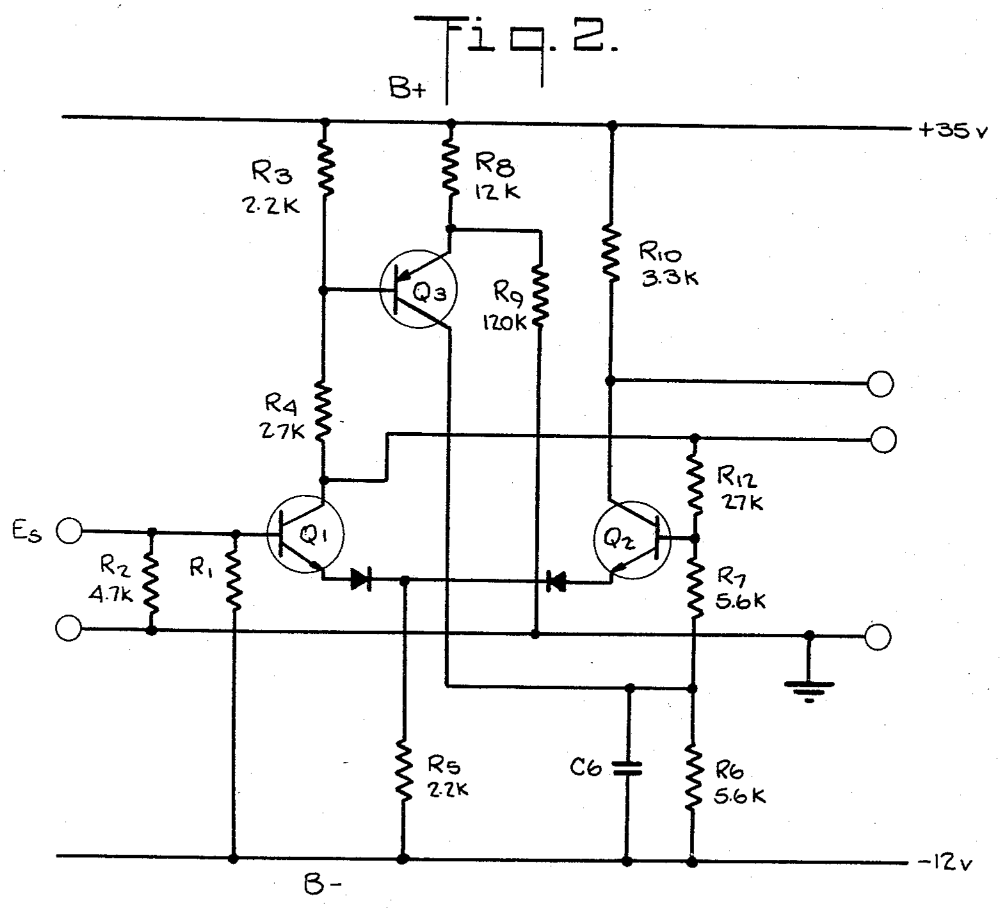

Other objects and purposes of this invention will become apparent from a consideration of the following detailed description and drawings, in which:

FIG. 1 is an electrical schematic of a transistorized prior art Schmitt trigger, and FIG. 2 is an electrical schematic of a Schmitt trigger incorporating one embodiment of the improvement taught by this invention.

*Concerning terminology*

Throughout this application, it should be understood that a reference to an increase in voltage or a decrease in voltage does not refer to absolute magnitude but takes into account the sign of the voltage involved. Thus a change in potential from minus 12 volts to zero volts would be considered an increase in voltage. If this voltage were applied to the base of a transistor, it might be referred to herein as an increase in bias. Consistent with this terminology, when it is said herein that a decrease in potential on the collector of the transistor $Q_1$ results in pulling down the base of the transistor $Q_2$, it is meant that the base of the transistor $Q_2$ goes from a more positive to a less positive value. To say that the base of the transistor $Q_2$ goes from a more positive to a less positive value may include passing through ground as when going from a positive value to a negative value. Indeed, consistent with this invention, a point that goes from let us say minus two volts to let us say minus 10 volts would be considered as going from a more positive to a less positive value.

Reference is made throughout this application to a Schmitt trigger because that term has achieved widespread use and covers a fairly clear cut class of trigger designs. However, it should be understood that this in-invention has applicability to any bistable switching circuit which exhibits the hysteresis characteristic above described.

*The prior art*

FIG. 1 illustrates a typical Schmitt trigger without the improvement added by this invention. The Schmitt trigger shown happens to involve two NPN transistors $Q_1$ and $Q_2$.

The Schmitt trigger is a binary circuit having two states, in one state the transistor $Q_1$ is on and the transistor $Q_2$ is off; while in the other state the transistor $Q_2$ is on and the transistor $Q_1$ is off. The Schmitt trigger has the distinction over other binanry circuits of having a very fast switching action, that is a very short switching time. The tying of the two emitters together and the provision of a common emitter resistor $R_5$ provides the additional regenerative feedback which speeds up the switching action. Since the operation of the Schmitt trigger is well known to those skilled in this art, it will not be necessary to do more than outline its operation to set the base for a discussion of the improvement provided by this invention. A more comprehensive discussion of the operation of the Schmitt trigger may be had by reference to paragraphs 5–10 and 5–11 in "Pulse and Digital Circuits" by Millman and Taub (McGraw-Hill, 1956). The Millman and Taub reference discusses the operation of the Schmitt trigger when designed to employ electron tubes instead of transistors. A short explanation of a transistorized Schmitt trigger is provided in paragraph 196 in "Basic Theory and Application of Transistors" (Army Technical Manual TM11–690, 1959).

Suffice it to say here, that the resistors $R_{12}$ and $R_{67}$ operate as a voltage divider to provide a control voltage on the base of the transistor $Q_2$. The trigger of FIG. 1 is designed so that when in a quiescent state (that is there being no input signal $E_s$) the transistor $Q_1$ will be shut off because its base is connected to the negative supply B— through the resistor $R_1$. Under these conditions the transistor $Q_2$ will conduct since its emitter is negative, being connected to the negative supply B— through the resistor $R_5$, and its base is sufficiently positive relative to its emitter because of the selection of appropriate values for the voltage divider resistors $R_{12}$ and $R_{67}$.

In the design illustrated herein (with the resistor and power supply values indicated in the figures), the base of the transistor $Q_2$ will be at approximately zero potential when transistor $Q_1$ is cut off. Since transistor $Q_2$ is conducting, its emitter will follow its base and the emitter current will be whatever is required to provide the required drop across the emitter resistor $R_5$. The design is such that the emitter current required will assure conduction in the saturation portion of the $Q_2$ characteristic. In brief, $Q_2$ is hard on.

The input signal $E_s$ when applied to the base of the transistor $Q_1$ will turn on that transistor $Q_1$ at the moment when the signal $E_s$ becomes sufficiently positive to provide the forward bias necessary to cause the transistor $Q_1$ to start conducting.

As the transistor $Q_1$ turns on in response to the appropriately positive signal on its base, current through the resistor $R_{43}$ will increase thereby causing a drop in potential at the collector of the transistor $Q_1$, which drop in potential will be reflected in a proportionate drop in potential at the base of the transistor $Q_2$. The proportionate voltage drop at the base of the transistor $Q_2$ is a function of the ratio between the voltage divider resistors $R_{12}$ and $R_{67}$. Thus as the potential on the base of $Q_2$ goes negative there is a tendency for the transistor $Q_2$ to turn off.

To speed up the switching there is included in the Schmitt trigger type of design a connection between the emitter of the transistor $Q_1$ and the emitter of the transistor $Q_2$ which connection is then connected to the negative supply B— through the resistor $R_5$. As the transistor $Q_1$ turns on, the increased current through the resistor $R_5$ results in a less negative emitter potential (on both the emitters of the transistors $Q_1$ and the emitter of the transistor $Q_2$). Thus the flow of current through the transistor $Q_1$, as that transistor turns on, simultaneously reduces the voltage on the base of the transistor $Q_2$ and increases the potential on the emitter of the transistor $Q_2$. In this fashion the time it takes to turn off the transistor $Q_2$ is relatively small and the switching can be considered to be relatively fast as compared to other bistable designs.

The resistor values, voltages and designs are such that the transistors are turned hard on and hard off so that they operate in their saturation region and the magnitude of transistor current is substantially independent of the magnitude or rise time of the input signal $E_s$.

When the input signal $E_s$ decreases in voltage magnitude below a certain critical point, this bistable trigger will switch back the other way. As the input signal $E_s$ decreases, the base of the transistor $Q_1$ is rendered sufficiently negative by the negative supply B— so as to turn the transistor $Q_1$ off. As it starts to turn off, a decrease in current through the transistor $Q_1$ will result in less current through the resistor $R_{43}$ so that the collector of the transistor $Q_1$ will go more positive and, accordingly, a proportionate increase in potential will be applied to the base of the transistor $Q_2$. Concurrently, the decrease in current through the common emitter resistor $R_5$ will drop the potential on the emitters therefore increasing the forward bias on the transistor $Q_2$ and increasing the rate at which the transistor $Q_2$ will turn on.

This Schmitt trigger, as does all Schmitt triggers, exhibits the well known Schmitt trigger phenomenon that is called hysteresis. This means that the magnitude of the critical signal voltage to trigger the transistor $Q_1$ on is greater than the magnitude of the critical voltage necessary to switch the transistor $Q_1$ off. This phenomenon may be appreciated by assuming that the transistor $Q_1$ is turned on by, let us say, an increase in base voltage from just below the firing point to just above the firing point. When this occurs, the collector of the transistor $Q_1$ drops in potential because of the increased current flow through the transistor $Q_1$ and, correspondingly, the base potential on a transistor $Q_2$ decreases a proportional amount. In addition, once the transistor $Q_1$ has been turned on, its emitter will be at substantially the same potential as its base and, since the emitters of the transistors $Q_1$ and $Q_2$ are tied together, the emitter of the transistor $Q_2$ will follow the emitter of the transistor $Q_1$ and go more positive. Thus the base of the transistor $Q_2$ will, on the switching action, drop a number of volts negative and the emitter of the transistor $Q_2$ will rise a number of volts so that the transistor $Q_2$ will be turned hard off. In this fashion, a very small increment in transistor $Q_1$ base voltage from just below its triggering point to just above its triggering point will result in a great change in base to emitter voltage in the transistor $Q_2$. Accordingly, a small drop in the base voltage on the transistor $Q_1$ from just above its firing point to the voltage that it had just before it fired will not suffice to turn on the transistor $Q_2$ nor turn off the transistor $Q_1$. Thus the base voltage on the transistor $Q_1$ must drop well below its "on" firing point in order to cause the reverse triggering. This difference between the triggering voltage necessary on the ascending slope of an input signal $E_s$ and the descending slope of an input signal $E_s$ has been called hysteresis.

It is this hysteresis which produces stability in the Schmitt trigger since it assures that a switch once it starts will continue. The hysteresis is also a concomitant of the fast switching.

*The invention*

FIG. 2 is an embodiment of this invention and specifically illustrates an improvement on the prior art Schmitt trigger which will permit setting the refire point at the same voltage level as the firing point while retaining the benefit of the hysteresis.

FIG. 2 illustrates a symmetrically firing Schmitt trigger which fires on the ascending slope of the input signal $E_s$ in exactly the same fashion as does the prior art trigger illustrated in FIG. 1. However, once it has fired, so that the transistor $Q_1$ is on (and the transistor $Q_2$ is off) a current is pumped through the resistor $R_6$ in such a direction and magnitude so as to change the potential on the base of the transistor $Q_2$ in a direction and to an extent sufficient to cause the transistor $Q_2$ to refire once the input signal has decreased to a magnitude substantially equal to the triggering voltage. This result is achieved by use of the current source $Q_3$.

Before describing the operation of the current source $Q_3$, it should be noted that the single $Q_1$ collector resistor $R_{34}$ of the prior art design has been split into two resistors $R_3$ and $R_4$ so that the base of the current source $Q_3$ may be connected between the resistor $R_3$ and the resistor $R_4$. In this fashion the voltage magnitude on the base of the current source $Q_3$ will change proportionately with the voltage changes on the collector of the transistor $Q_1$. In addition, the $Q_2$ base resistor $R_{67}$ of the prior art is split into two resistor $R_6$ and $R_7$ so that the collector of the current source $Q_3$ can be connected, as shown, between these two resistors $R_6$ and $R_7$. In this fashion, the voltage on the base of the transistor $Q_2$ will be modified as a partial function of the magnitude of the current that is supplied by the current source $Q_3$.

It should be noted that the current source $Q_3$ in the embodiment shown is a PNP transistor. Accordingly, $Q_3$ will tend to be turned on by a drop in its base bias. The circuit is designed so that an appropriate drop does occur when the collector $Q_1$ drops as $Q_1$ is turned on. The base bias drop in $Q_3$ turns on $Q_3$ so that a current will flow through $Q_3$ and the resistor $R_6$. The consequent current flow in the resistor $R_6$ raises the base bias on this NPN transistor $Q_2$ to a point where the transistor $Q_2$ can be more readily turned on than just prior to the $Q_3$ current flow. The triggering voltage as the input signal $E_s$ descends can thus be set to be equal to the triggering voltage when $E_s$ increases so that the result is a symmetrically firing Schmitt trigger.

The switching action between $Q_1$ and $Q_2$ occurs very much more rapidly than the turning on the transistor $Q_3$. As a consequence, the increase in the bias on the base of the transistor $Q_2$ due to $Q_3$ current flow occurs *after* the bias on the base of $Q_2$ has been decreased by the switching action between the transistors $Q_1$ and $Q_2$. If the time lag between the switching of the transistors $Q_1$ and $Q_2$ and the turning on of the current source $Q_3$ is not great enough, a capacitor $C_6$ may be added to increase the time lag sufficiently so that there will be no interruption with the fast switching operation and so that the switching operation will not be rendered unstable.

The magnitudes of the resistors $R_8$ and $R_9$ are selected to control the magnitude of the current provided by the current source $Q_3$.

Because of this increased current through the resistor $R_6$, the base to emitter voltage of the transistor $Q_2$ is modified in such a fashion that the transistor $Q_2$ will turn on when the signal voltage $E_s$ decreases to the desired switching voltage. It should be pointed out that this reverse switching occurs because as $E_s$ decreases, the emitter of the transistor $Q_1$ also decreases since it is tied to the base of the transistor $Q_1$ when the transistor $Q_1$ is turned on. Since the emitter of $Q_1$ decreases, the emitter of $Q_2$ must also decrease, it being tied directly to the emitter of the transistor $Q_1$. When the emitter of $Q_2$ decreases to the point such that there is sufficient forward bias on the transistor $Q_2$, the transistor $Q_2$ will turn on. As $Q_2$ turns on, $Q_1$ turns off due to the decreased base voltage on $Q_1$ resulting from the decreasing input signal $E_s$ and due to the increasing emitter voltage resulting from an increased current through the common emitter resistor $R_5$. The turning off of the transistor $Q_1$ concurrently causes a decrease in current through the collector resistors $R_3$ and $R_4$ so that the collector of the transistor $Q_1$ rises, resulting in an increase in the base voltage of the transistor $Q_2$. This feedback turns the transistor $Q_2$ on even harder so that a bistable switching operation occurs. Concurrently, the decrease in current through the collector resistors $R_3$ and $R_4$ causes an increase in bias voltage on the PNP transistor $Q_3$ so that the current source $Q_3$ tends to turn off resulting in a decrease in the current through the resistor $R_6$. This decrease in current through the resistor $R_6$ returns the base voltage of the transistor $Q_2$ to its original value so that there will be repeatable switching when the input signal $E_s$ starts to rise again.

From the above description it should be clear that in brief terms this invention involves the provision of a current source whose magnitude is responsive to the collector voltage on the transistor $Q_1$ and this current will be used to modify the base voltage on the transistor $Q_2$. A current source having these characteristics and operating (in response to changes in the collector voltage on the transistor $Q_1$) at a slower rate than the switching rate will provide the change in transistor $Q_2$ base voltage necessary to compensate for the hysteresis and yet will not cancel out the hysteresis while switching takes place. Thus this invention retains the advantages of having hysteresis during switching and compensating for the effect of hysteresis during refiring.

The above description is of one particular embodiment of this invention. It would be apparent to those skilled in this art to make such modifications as would be necessary to adapt this invention to valves other than the NPN transistors $Q_1$ and $Q_2$ illustrated. Thus, PNP transistors could be employed with the appropriate change in voltage signs. It would also be possible to apply this invention to a Schmitt trigger employing electron tubes. Accordingly, it is intended in the claims to cover all such modifications as would fall within the scope of the invention.

For example, the major intended use of the invention is to design a symmetrically firing Schmitt trigger. However, there is no reason why the invention should be limited to those applications where the refiring point must be the same as the firing point. In effect, this invention provides a technique whereby the amount of hysteresis can be controlled by the design explained herein. The amount of hysteresis compensation can be designed to be any predetermined magnitude. Where designed for a symmetrically firing Schmitt trigger, the compensation is sufficient to equal the hysteresis and thus cancel out its net effect on refire voltage. In other applications differing amounts of compensation can be used so as to set the refiring point at any level.

The amount of hysteresis compensation supplied can be sufficiently great so as to reverse the relative voltage levels between the fire and refire points. For example, in the embodiment illustrated, the refire point is at a lower voltage level than the firing point. By means of this invention, the hysteresis could be so over-compensated that the refire point would be at a higher voltage than the firing point. This over-compensation of hysteresis would not otherwise affect the operation of the switch in that the switch would still fire on a rising signal and refire on a falling signal.

This ability to change the relative voltage levels of the fire and refire point is unique with this invention and cannot be achieved with the hysteresis compensation techniques employed in prior art Schmitt triggers.

In addition to the particular type of design illustrated above in which a signal is supplied that tends to cancel hysteresis and that, by the proper selection of parameters, either reduces hysteresis, cancels the hysteresis or overcompensates for the hysteresis, it is possible to supply a signal which will tend to add to the hysteresis already present. Thus it is within the ambit of this invention to supply a bias to the control signal of the second valve (that is to the base of the transistor $Q_2$ in this embodiment) which will add to, as contrasted with compensate for, the hysteresis otherwise developed by the switching design.

The switch illustrated is one which fires on a rising input signal and refires on a declining input signal. However, a switch can readily be designed to fire on a declining input signal and refire on a rising input signal and the teachings of this invention can be applied to such a switch to cause a modification in the hysteresis inherent in that switch design.

Concerning terminology in the following claims, it should be understood that the use of the term function to relate parameters refers to partial function as well as complete function. Thus the bias on the transistor $Q_2$ is a function of the state of the transistor $Q_1$ because the state of $Q_1$ does affect that bias even though other factors such as the bus bar voltage levels, the magnitudes of the resistors $R_6$ and $R_7$, and the current output from the transistor $Q_3$ also affect the base bias on $Q_2$. Accordingly, the base bias on $Q_2$ is only a partial function of the state of $Q_1$ yet, herein, it is to be understood that the term function includes partial function.

The embodiment described in detail above broadly involves a control means $Q_3$ which responds to the state of the transistor $Q_1$ to modify the bias on the transistor $Q_2$. The control means could just as well be designed to sense the state of the transistor $Q_2$ in order to modify the bias on the transistor $Q_1$ and in that fashion to modify the hysteresis of the overall switching device. After all, this is a bistable device and the modification of the bias on either of the switching elements would have comparable results. It is to be understood, herein, that a reference to a first valve and a second valve in the claims is strictly for the purpose of subsequent reference within each claim and the phrase "first valve," in general, refers to whichever valve is the one whose state is sensed by the control means. The fact that the transistor $Q_1$ is the valve at the input to the circuit does not mean for the purpose of this application and its claims that it is necessarily a "first valve."

What is claimed is:

1. In a bistable switching circuit having a first valve and a second valve, each of said valves having a first state and a second state and being interconnected such that said circuit has a first stable state and a second stable state, each of said valves having a control element and a low impedance output element, the low impedance elements of said valves being coupled to one another and having a common resistor, said circuit including an input lead connected to the control element of said first valve so that an input signal passing a first threshold voltage in a first direction will fire said circuit into its first state and an input signal passing a second threshold voltage in a second direction will refire said circuit into its second state, the improvement comprising:

a voltage dividing bias means coupled to the control element of said second valve, and control means responsive to said second state of said circuit to provide a control signal when said circuit is in said second state, said control signal being coupled to a point on said voltage dividing bias means to modify the bias on said control element of said second valve during said second state of said circuit.

2. The bistable switching circuit improvement of claim 1 wherein said control means is a current source comprising a third valve having an off state and an on state, the output of said current source being coupled to said point on said voltage dividing bias means, the control element of said third valve being coupled to the output of said first valve so that the state of said first valve will determine the state of said third valve.

3. The bistable switching circuit of claim 1 wherein said voltage dividing bias means is a first and second resistor connected in series to said control element of said second valve, and wherein the juncture between said resistors is said point to which said control signal is coupled.

4. The bistable switching circuit improvement of claim 1 further characterized by:

time delay means connected to said point on said voltage dividing bias means to provide a predetermined time delay in the application of said control signal to said control element of said second valve.

5. In a bistable switching circuit having a first transistor and a second transistor, each of said transistors having base, collector and emitter electrodes, said emitter electrodes being coupled to one another and having a common emitter resistor, said transistors being coupled to one another to provide said circuit with a first stable state and a second stable state, said circuit including an input lead connected to said base of said first transistor so that a rising input signal passing a first threshold voltage will fire said circuit into said first stable state and a falling input signal passing a second threshold voltage will refire said trigger into said stable state, the improvement comprising:

a voltage dividing bias means coupled to said base of said second transistor, and a current source responsive to said second state of said circuit to provide a control signal when said circuit is in said second state, said control signal being connected to a point on said voltage dividing bias means to modify the bias on said base of said second transistor during said second state of said circuit, whereby said bias on said base of said second transistor will have a first predetermined value when said circuit is in said first state and a second predetermined value when said circuit is in said second state.

6. The bistable switching circuit improvement of claim 5 wherein said current source is a third transistor having an off state and an on state, said third transistor having base, collector and emitter electrodes, said base electrode of said third transistor being coupled to said collector of said first transistor so that the state of said first transistor will determine the state of said third transistor, the current output of said third transistor being said control signal that is connected to said point on said bias means.

7. The bistable switching circuit of claim 5 wherein said voltage dividing bias means is a first resistor and a second resistor connected in series to said base of said second transistor, and wherein the juncture between said resistors is said point to which said control signal is connected.

8. The bistable switching circuit improvement of claim 7 further characterized by:

a capacitor connected across said second resistor to provide a predetermined time delay in the application of said control signal to said base of said second transistor.

References Cited

UNITED STATES PATENTS

| | | | |
|---|---|---|---|
| 2,827,574 | 3/1958 | Schneider | 307—88.5 |
| 3,008,088 | 11/1961 | Beeler | 328—203 |
| 3,018,386 | 1/1962 | Chase | 307—88.5 |
| 3,151,256 | 9/1964 | Simon et al. | 307—88.5 |
| 3,191,064 | 6/1965 | Ih | 307—88.5 |

FOREIGN PATENTS 1,098,032 1/1961 Germany.

JOHN W. HUCKERY, *Primary Examiner.*

J. D. CRAIG, *Assistant Examiner.*